Figure 1:
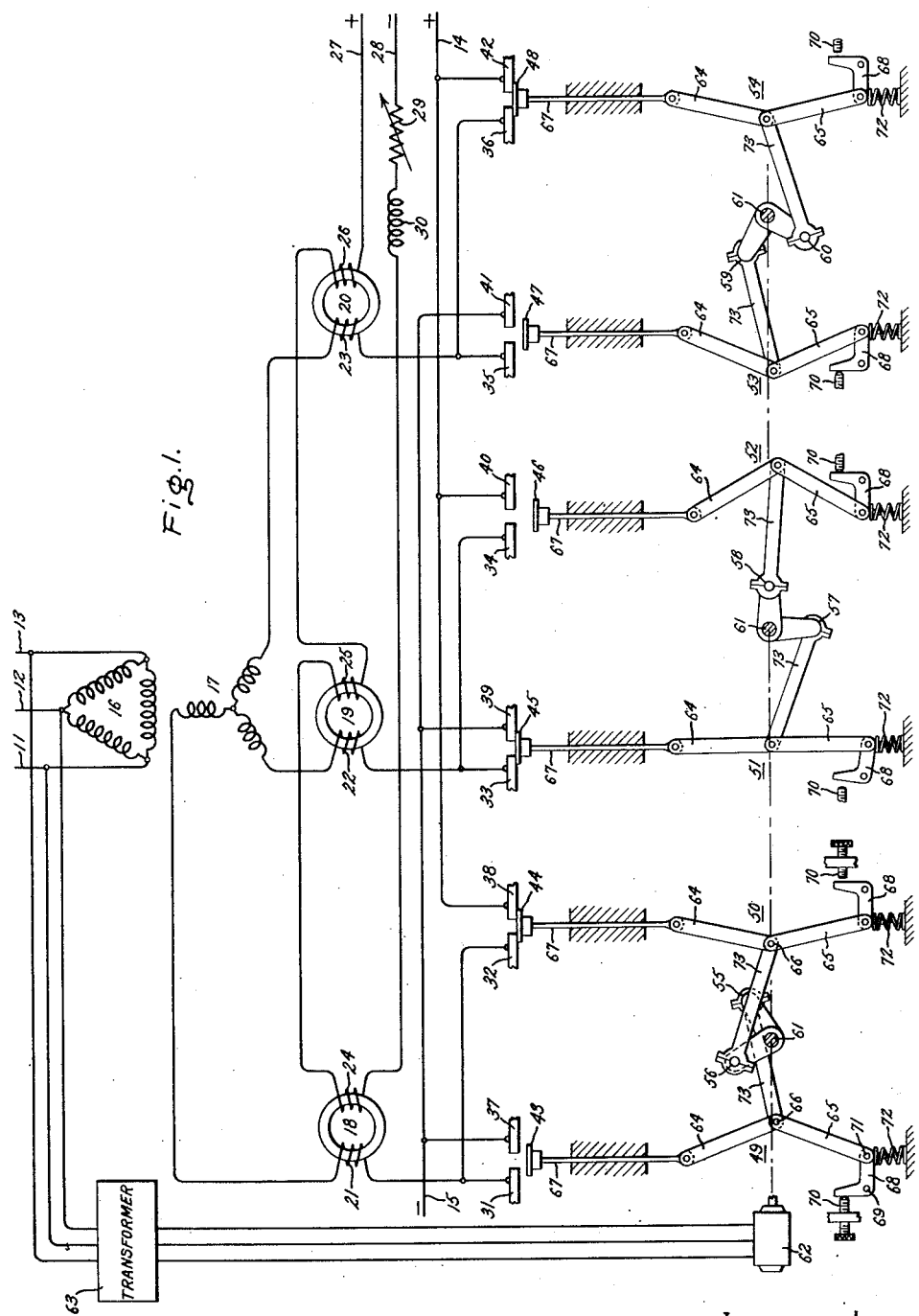

Oct. 29, 1957  J. A. FAVRE  2,811,596
RECIPROCATING SWITCHING DEVICE
Filed Feb. 21, 1955  2 Sheets-Sheet 1

Inventor:
John A. Favre,
by (signature)
His Attorney.

Oct. 29, 1957 J. A. FAVRE 2,811,596
RECIPROCATING SWITCHING DEVICE
Filed Feb. 21, 1955 2 Sheets-Sheet 2
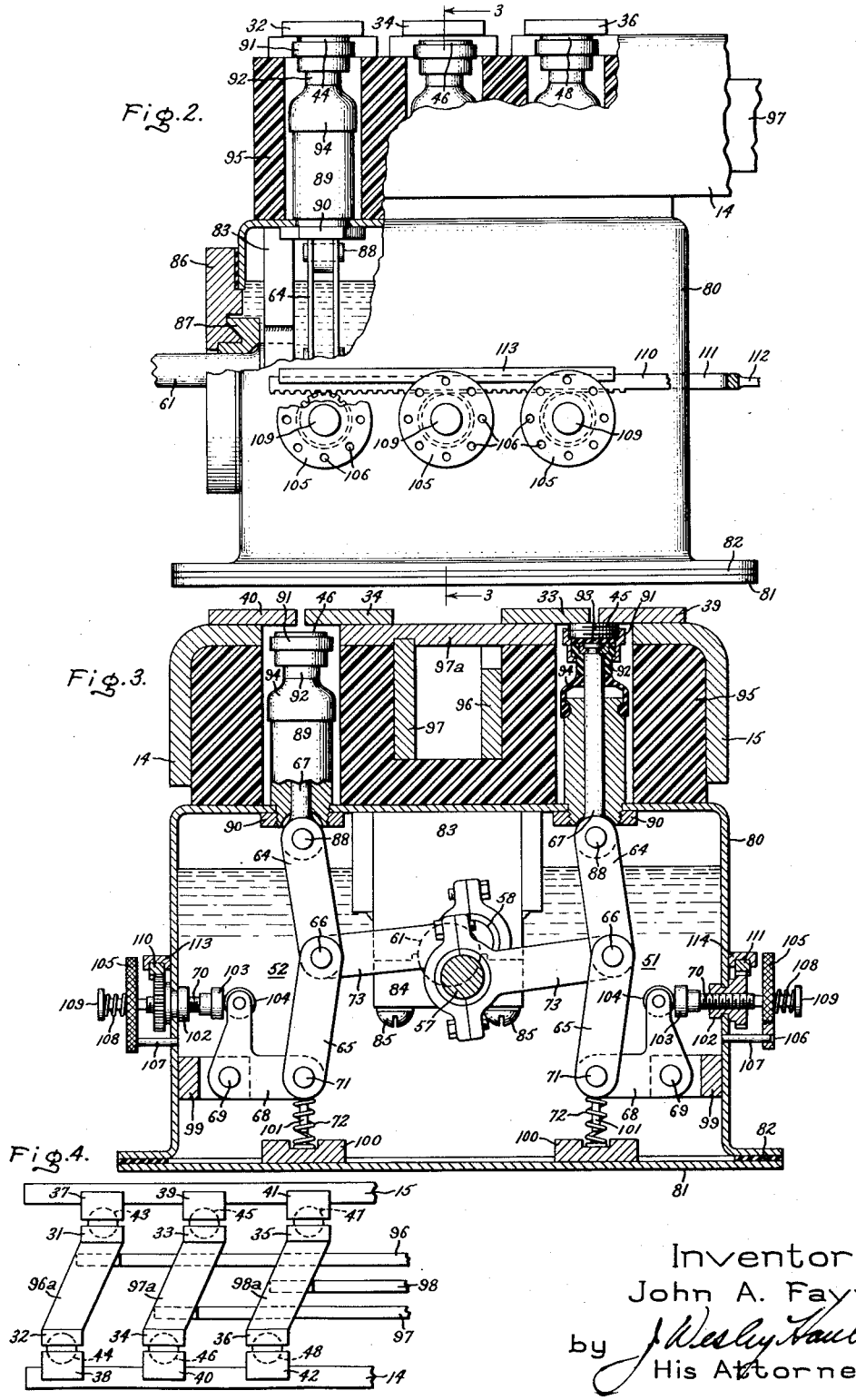
Inventor:
John A. Favre,
by J. Wesley Haubner
His Attorney.

2,811,596
United States Patent Office    Patented Oct. 29, 1957

2,811,596

RECIPROCATING SWITCHING DEVICE

John A. Favre, Broomall, Pa., assignor to General Electric Company, a corporation of New York Application February 21, 1955, Serial No. 489,680

4 Claims. (Cl. 200—19)

This invention relates to a reciprocating switching device, and more particularly to a toggle mechanism for reciprocally operating an electric switch and having convenient adjusting means for changing the closed time or dwell of the switch contacts.

In certain electric circuit applications, it is desirable to operate an electric switch at regularly recurring intervals, and the portion of each switching cycle during which the switch contacts are closed, which portion will be referred to hereinafter as the "contact dwell," may be a critical factor in obtaining correct operation of the particular electric circuit. An application such as this is found, for example, in mechanical rectifier equipment, wherein a series of electric switches are sequentially operated 60 times each second to convert a polyphase source of conventional 60 cycles per second alternating current into substantially constant magnitude direct current. It can be readily appreciated that in order to obtain correct rectifying action, accurate timing of the contact dwell of each electric switch is essential. The extreme degree of accuracy and uniformity demanded by such application is difficult to obtain, due to factors such as inaccuracies in manufacturing tolerances and uneven wear of the components of these highly repetitive switching devices. Therefore, it is particularly desirable to provide means for independently adjusting the contact dwell of each electric switch. And for the sake of convenience as well as accuracy, it is preferable that such adjusting means be operable without necessitating interruption or shut-down of the mechanical rectifying operation. In some circumstances, it is also desirable to vary collectively the contact dwells of all mechanical rectifier switches, thereby to compensate for changes in the magnitude of rectified current caused by changed load requirements. Therefore, it is desirable to have contact dwell adjusting means which can be operated in unison as well as individually. Accordingly, it is a general object of this invention to provide an electric switching device having cyclic operating means which can be conveniently adjusted to change contact dwell.

Another object of this invention is to provide, for a switching device comprising a series of electric switches reciprocating in sequential overlapping relationship, cyclic operating means including means for either independently or jointly varying the contact dwell of each electric switch while said switching device is operating.

Still another object of this invention is to provide toggle mechanisms for operating a plurality of reciprocating electric switches and having means to vary the contact dwell of each electric switch either individually or collectively.

In carrying out my invention in one form, I provide a toggle mechanism having an upper and a lower link interconnected to form a knee. The upper link carries a movable switch contact which is disposed for reciprocating movement in a generally endwise direction with respect to the toggle mechanism. A cooperating stationary switch contact is disposed for circuit making engagement with the movable switch contact. The lower link of the toggle mechanism is pivotally connected to a yieldable support which can be moved in a generally endwise direction with respect to the toggle mechanism. Adjustable stop means defines the limit of deflection of the aforesaid support in one direction only. In one aspect of my invention, I provide rotatable camming means to drive the knee of the toggle mechanism through a cyclic lateral path, thereby producing reciprocating movement of the movable switch contact. The portions of the cyclic lateral path of movement of the knee during which the movable and stationary switch contacts are in circuit making engagement can be varied by adjusting the adjustable stop means. The adjustable stop means is arranged not only for independent adjustment but also for joint adjustment together with other adjustable stop means associated with similar reciprocating switching devices which may be provided in combination with the switching device just described.

My invention will be better understood and further objects and advantages will be apparent from the following description taken in conjunction with the accompanying drawings in which Fig. 1 is a schematic representation of the electrical connections and reciprocating switching devices of a mechanical rectifier system embodying a preferred form of my invention; Fig. 2 is a partially cut away elevational view of a mechanical rectifier embodying the switching devices illustrated schematically in Fig. 1; Fig. 3 is a cross-sectional view of the mechanical rectifier taken through line 3—3 of Fig. 2 and showing one pair of electric switches operated by the toggle mechanisms embodying the principles of my invention; and Fig. 4 is a partial plan view of the mechanical rectifier shown in Fig. 2 to illustrate the physical arrangement of A.-C. and D.-C. buses.

The mechanical rectifying equipment, shown schematically in Fig. 1 by way of example, is supplied by a three-phase source of alternating current, represented by conductors 11, 12, and 13. The mechanical rectifier operates to convert this alternating current into substantially constant magnitude direct current which is conveyed to a direct current load circuit, not shown, by a positive and a negative load bus, 14 and 15 respectively. The alternating current source is connected to delta-connected primary winding 16 of a three-phase power transformer having Y-connected secondary windings 17. The three secondary windings 17 are respectively connected to saturable commutating reactors 18, 19 and 20. These commutating reactors may comprise, for example, a main winding, 21, 22 and 23 respectively, and a control winding 24, 25 and 26 respectively, wound on a common magnetizable core, as schematically illustrated in Fig. 1. The impedance of each reactor is a function of the excitation of its control winding and also a function of the magnitude and polarity of the transformer secondary potential, and each reactor is arranged to reduce to substantially zero the instantaneous value of the outgoing phase current flowing in its main winding during the period required by the associated rectifier switch contacts to open following commutation, thereby preventing electric arcing or sparking at the switch contacts. The function of saturable commutating reactors such as 18, 19, and 20 in mechanical rectifier equipment is more fully described in Patent No. 2,284,794 issued on June 2, 1942, to Burnice D. Bedford. Control windings 24, 25, and 26 are energized from a controlled source of electric energy, represented in Fig. 1 by conductors 27 and 28. A variable resistor 29 is connected in this excitation control circuit to effect changes in the magnitude of current flowing through the control windings 24, 25, and 26. An inductive element 30 may be connected in series circuit relationship with the control windings thereby to smooth the flow of current through these windings.

In the mechanical rectifier equipment illustrated in Fig. 1, six electric switches are utilized to perform the rectifying operation. Each switch preferably comprises a pair of fixed switch contacts and a cooperating movable bridging contact. Main winding 21 of commutating reactor 18 is connected to fixed contacts 31 and 32, main winding 22 is connected to fixed contacts 33 and 34, and main winding 23 is connected to fixed contacts 35 and 36. Fixed contacts 37, 39 and 41 are connected to negative bus 15 while fixed contacts 38, 40 and 42 are connected to positive bus 14. As shown in Fig. 1, each cooperating bridging contact, 43–44 inclusive, is disposed for reciprocating movement along a straight-line path into and out of circuit making engagement with an associated pair of the relatively stationary contacts, 31, 37; 32, 38; 33, 39; 34, 40; 35, 41, and 36, 42 respectively. Each reciprocating contact 43–48 is operated by its own toggle mechanism, designated generally by reference characters 49–54, and each toggle mechanism in turn is driven by a separate camming member or crankpin 55–60 fixed to a common crankshaft 61. Each toggle mechanism is disposed in generally transverse relationship to the axis of the crankshaft 61. Crankshaft 61 is rotated by a suitable synchronous motor 62 which is supplied from suitable transforming means 63 connected to the source of alternating current represented by conductors 11, 12 and 13. Thus, crankshaft 61 operates at a predetermined constant rate in synchronism with the alternating current to be rectified. For conventional 60 cycles per second A.-C., and with the relative arrangements of toggle mechanisms 49–54 and crankpins 55–60 shown in Fig. 1 and described below, the speed of motor 62 will be 1800 R. P. M., or ½ revolution per cycle of A.-C.

As viewed in Fig. 1, each toggle mechanism 49–54 comprises an upper link 64 and a lower link 65, and one end of each link is pivotally joined to form a knee 66. The other end of upper link 64 is pivotally connected to a rod 67 which carries the associated bridging contact 43–48. Suitable laterally disposed guide means limit rod 67 to linear movement in a substantially endwise direction with respect to the toggle mechanism. In accordance with my invention, the other end of lower link 65 is pivotally connected to movable support means which comprises essentially an elongated member 68 disposed generally perpendicular to the toggle mechanism. A first end of member 68 is pivotally joined to the lower link at 71, and a second end of member 68 is pivotally supported by means of a pin 69 at a fixed point spaced laterally from link 65, as can be seen in Figs. 1 and 3. Although I do not wish to be limited thereto, the actual support means that has been shown in the drawings by way of illustration comprises a generally L-shaped member having its vertex pivotally mounted on the fixed pin 69. One leg of the L-shaped piece is the elongated member 68 whose first end is pivotally connected to link 65 at 71, and the other leg of the L-shaped piece is an upstanding member disposed in cooperating relationship with suitable adjusting means, such as, for example, a screw 70. The adjusting means is used to move the support member 68 pivotally about the fixed pin 69, whereby the position of the first end (71) of the support 68 may be adjusted along a path generally collinear to the line of movement of the associated bridging contact 43–48. The specific arrangement of the preferred adjusting means is shown in Figs. 2 and 3 and will be described in greater detail hereinafter.

As is clearly shown in Fig. 1, each support member 68 is disposed so that its first end is substantially in alignment with and normally disposed on the line of movement of the associated bridging contact. Suitable bias means, such as a compression spring 72, is provided tending to tilt or deflect each support 68 in a direction toward the lower link 65. With this arrangement, the first end of support 68 is yieldable arcuately with respect to pin 69 and in a generally endwise direction with respect to the toggle mechanism, and the pivoted end 71 of lower link 65 is urged in one direction to a normal position, beyond which it can not be moved, by the influence of bias spring 72. This normal position of the pivoted end 71 of lower link 65 is determined by the setting of the adjusting means 70. A suitable rigid connecting link 73 interconnects knee 66 and the associated camming member or crankpin 55–60.

As should be apparent from the above description, rotation by crankshaft 61 will drive the knee 66 of each toggle mechanism 49–54 through a cyclic, generally lateral path of movement. This lateral movement is translated by the resulting opening and closing of the toggle mechanism into highly repetitive reciprocating movement of the bridging contacts 43–48. For the purposes of the illustrated embodiment of my invention, the eccentricity of crankpins 55–60 and the length of connecting link 73 preferably are selected to produce bilateral movement of knee 66, i. e., knee 66 during each operating cycle of crankshaft 61 is moved laterally in both directions from a mid-position wherein upper and lower links 64 and 65 are in alignment. The toggle mechanism 51 of Fig. 1 is in this mid-position. The lengths of links 64 and 65 and of rod 67 are selected whereby at both extremities of the cyclic lateral path of knee 66, the associated bridging contact is disengaged from its cooperating pair of fixed contacts, and whereby at the mid-position of knee 66, the bridging and fixed contacts are in circuit making engagement.

The contact dwell of each electric switch is determined by the setting of its associated adjusting means 70. In the cyclic lateral path of movement of knee 66, there are two points, equidistant from and on opposite sides of the mid-position, at which the bridging contact just makes or breaks circuit with its cooperating fixed contacts. These points are determined by the normal position of the pivoted end 71 of lower link 65, which position in turn is established by the setting of the adjusting means 70. During the course of movement of knee 66 intermediate the above determined points, bias spring 72 is compressed as the support member 68 yields to permit knee 66 to pass through its mid-position, and firm contact pressure thereby is maintained between cooperating bridging and fixed contacts. This portion of the cyclic lateral path of movement of knee 66, during which the electric switch contacts are closed, is known as the contact dwell and is conveniently referred to in terms of the angular degrees of rotation by the crankpin 55–60 required to drive knee 66 therethrough. During movement of knee 66 between each of the above determined points and the corresponding lateral extremity of its cyclic path, endwise movement of lower link 65 is prevented by the adjusting means 70, and the instantaneous position of the bridging contact will be directly related to the lateral displacement of the knee. At all times during this lateral movement of the knee, the bridging contact necessarily is parted from its cooperating fixed contacts thereby producing an open circuit condition. It should be evident from the foregoing description that essentially the same result could be obtained by providing an adjustable rigid support for the pivoted end 71 of lower link 65 and substituting yieldable contacts 31–42 or a yieldable section in either of the links 64 and 65 or in rod 67 in place of the yieldable support member 68 illustrated in the drawings.

It is highly desirable for accurate mechanical rectifier operation that a cyclically operated electric switch consistently make circuit at the same relative instant in each succeeding cycle of alternating current. Similarly, the circuit should be broken at the same relative instant in every cycle. To obtain this desired consistent switching condition in the illustrated embodiment of my invention, wherein knee 66 of a toggle mechanism is driven bilaterally by crankshaft 61 thereby carrying its bridging contact through two full switching cycles for every crankshaft revolution, it is necessary that succeeding points of circuit making (and breaking) by an electric switch correspond to exactly one half a revolution or 180 degrees rotation by crankshaft 61. With crankshaft 61 rotating at 1800 R. P. M. or ½ a revolution per cycle of 60 cycles per second alternating current, the electric switch will now consistently make (and break) circuit at the same relative instant every cycle. In other words, the beginning (and end) of each contact dwell of an electric switch, expressed in terms of angular degrees of rotation by the associated crankpin, ideally is disposed 180 degrees from the beginning (and end) of the succeeding contact dwell, and, as a necessary result, succeeding contact dwells are disposed to be bisected by a common diameter of a circle circumscribed by rotation of the crankpin. For the arrangement shown in Fig. 1, this bisecting diameter in all cases must be a vertical line passing through the axis of crankshaft 61. Thus, the angular displacement of a crankpin, with respect to its vertical position, at which the associated bridging contact just makes or breaks circuit with its cooperating fixed contacts during each switching cycle, will always be the same, and the desired accurate and consistent rectifying action is obtained. The above described relationship can be substantially achieved in the illustrated embodiment of my invention by appropriate selection of the length of connecting link 73 in relation to the transverse distance from the axis of crankshaft 61 to the aligned or midposition of upper and lower links 64 and 65 of the associated toggle mechanism.

As shown in the Fig. 1 embodiment of my invention, the cranks or arms of crankpins 55, 57 and 59 are disposed radially at 120 degree intervals thereby to drive their associated bridging contacts 43, 45 and 47 respectively, through sequential switching cycles whereby each of the three alternating current phases is connected to the negative load bus 15 during succeeding negative half cycles. Each of the crankpins 55, 57 and 59 is paired with one crankpin 56, 58 and 60, respectively, and the crank or arm of the latter is disposed 90 radial degrees behind the former, assuming clockwise rotation by crankshaft 61 as viewed in Fig. 1. It should be readily apparent that with this arrangement each bridging contact 44, 46 and 48 reciprocates in opposing relationship to its related bridging contact 43, 45 and 47, respectively. In other words, knee 66 of toggle mechanism 49, for example, is driven from its mid-position to the extremity of its lateral path while knee 66 of the paired toggle mechanism 50 is moving from its laterally extreme point toward a mid-position. Thus, bridging contacts 44, 46 and 48 reciprocate in sequential relationship to connect the three phases of alternating current to the positive load bus 14 during each succeeding positive half cycle. In this manner the desired rectifying action is obtained, and a substantially constant magnitude direct current is supplied to the remote load circuit via positive and negative buses 14 and 15.

Figs. 2 and 3 are elevational views of a preferred embodiment of the reciprocating switching devices illustrated schematically in Fig. 1 and described above. As shown in Figs. 2 and 3, the toggle mechanisms 49—54 are housed in a crankcase 80. The crankcase 80 is mounted on a base 81 by suitable fastening means, not shown. A gasket 82 is provided to seal the joint between crankcase 80 and base 81, thereby preventing leakage of the lubricating oil with which the crankcase is filled. Suitable shaft bearings, such as represented by split blocks 83 and 84, are provided for crankshaft 61 at each end of crankcase 80. As shown in Fig. 3, the crankshaft 61 is captured between bearing surfaces of blocks 83 and 84 when block 84 is secured to block 83 by a pair of screws 85. Block 83 is fixed to crankcase 80 by means which have not been shown. A sealing flange 86 is provided at one end of crankcase 80, and crankshaft 61 extends through this flange to connect to a remote synchronous motor, not shown. An oil seal 87 is provided on shaft 61 at the opening in flange 86, as is clearly shown in Fig. 2. Crankpins or eccentrics 55 and 56, 57 and 58, and 59 and 60 are arranged in pairs along crankshaft 61, as has been previously described. Toggle mechanisms 49, 51 and 53 are disposed along one side of crankcase 80, each in generally transverse relationship to the axis of crankshaft 61 and each connected to a crankpin 55, 57 and 59 respectively by a link 73. Toggle mechanisms 50, 52 and 54 are disposed along the other side of crankcase 80, each in a generally transverse relationship to the axis of crankshaft 61 and each connected to a crankpin 56, 58 and 60 respectively by a link 73.

The upper link 64 of each toggle mechanism comprises a pair of arms which are pivotally connected to rod 67 by a pin 88. The rod 67 of each toggle mechanism extends vertically through a suitable aperture in the top of crankcase 80. A guide cylinder 89 encircles rod 67 and fits snugly in each aperture, and clamping nuts 90 are used to secure each cylinder 89 to the crankcase 80. Cylinder 89 forms a close fit with rod 67 and limits this rod to linear reciprocating movement. The upper end of rod 67 carries a bridging contact 43—48. For the purposes of the illustrated embodiment of my invention, each bridging contact, as shown in Fig. 3, comprises a threaded plug made of suitable current conducting material. The plug is screwed into a collar 91 which is tightly fitted over a rigid electric insulating bushing 92 fastened to rod 67. A disk 93 of similar insulating material separates the upper end of rod 67 from the plug 43—48. Thus, the bridging contact is electrically insulated from rod 67 and all members connected thereto. A collar 94 of relatively resilient non-porous material is fastened to rod 67 and to the guide cylinder 89, and this collar provides a seal to prevent the lubricating oil in crankcase 80 from escaping. Whenever rod 67 moves, collar 94 extends and contracts as the bridging contact is carried through its reciprocating cycle.

A plurality of current conducting bars are supported over the top of crankcase 80 by suitable insulating material 95, as can be seen in Figs. 2 and 3. Fig. 4 is a plan view clearly showing the arrangement of these bars. Bars 96, 97 and 98, which are the three phase alternating current supply conductors, are connected to main windings 21, 22, and 23 respectively of the commutating reactors shown in Fig. 1 and described hereinbefore. Each alternating current bar 96, 97 and 98 extends through insulating material 95 and is coupled to a different two fixed contacts, 31 and 32, 33 and 34, and 35 and 36, by a connector 96a, 97a, and 98a respectively. Bars 14 and 15 are the positive and negative direct current load buses respectively and extend along opposite sides of insulating material 95. Each direct current bus is connected to a different three fixed contacts; 38, 40 and 42 and 37, 39 and 41 respectively. The fixed contacts are arranged by pairs in cooperating relationship with the bridging contacts, as illustrated in Fig. 4. Thus, for example, bridging contact 45 moves into and out of circuit making engagement with fixed contacts 33 and 39 during its switching cycle thereby to connect conductor 97 to negative bus 15 during succeeding negative half cycles of the alternating current in conductor 97. Similarly, bridging contact 46 moves into and out of circuit making engagement with fixed contacts 34 and 40 during its switching cycle thereby to connect conductor 97 to positive bus 14 during succeeding positive half cycles of the alternating current in conductor 97.

The dwell of each electric switch can be regulated by adjusting the position of adjusting means 70. For the purposes of the illustrated embodiment of this invention, as described hereinbefore, lower link 65 of each toggle mechanism is pivotally connected at 71 to the movable support means (member 68). Support member 68 is pivotally mounted on the fixed pin 69 which is held by a bracket 99 extending from the interior wall of crankcase 80, as can be seen in Fig. 3. A compression spring 72, which is seated in a block 100 secured to base 81, supplies a yieldable force tending to tilt or deflect the support 68 about pin 69 and toward the lower link 65. A guide pin 101 is used to prevent lateral movement by spring 72. The extent to which support 68 can be moved in accordance with its bias is determined by the adjusting means 70. The adjusting means, as shown by way of example in Figs. 2 and 3, comprises a screw 70 extending through a tapped mounting means or bushing 102 which is captured in a circular opening in the wall of crankcase 80 adjacent the associated support means. One end of screw 70 carries a bearing disk 103, and disk 103 is disposed adjacent to and in abutting relationship with a roller 104 pivotally connected to the upstanding leg of the support means. As screw 70 is turned into or out of bushing 102, disk 103 is moved further from or closer to the wall of crankcase 80, and roller 104 will follow along under the influence of bias spring 72. In this manner the support member 68 is tilted about its pivot 69, and the pivoted end 71 of lower link 65 of the associated toggle mechanism can be lowered or raised. It is now apparent that the adjusting means 70 serves in effect as an adjustably positioned stop means disposed in cooperating relationship with the adjacent support member 68 to define the limit of its deflection thereby limiting the arcuate movement of the first end of the support in an upward direction. Thus the setting of adjusting means or screw 70 establishes the normal position of the pivoted end 71 of the lower link 65. By lowering the normal position of the pivoted end 71, the distance between this end of the toggle mechanism and the fixed switch contacts is increased, and the precise portions of each operating cycle during which the associated bridging and fixed contacts are in circuit making engagement (the contact dwell), are reduced. Similarly, raising the normal position of the pivoted end 71 of lower link 65 increases the contact dwell.

To control the adjustment of adjusting screw 70, a knurled knob 105 is provided. The shank of screw 70 extending to the outside of crankcase 80 is made with a square cross section, and knob 105 has a cooperating square aperture which fits over this shank and enables the knob to slide longitudinally thereon. As shown in Fig. 2, knob 105 is provided with a plurality of circularly disposed holes 106, each hole being of suitable size to slide freely over a cooperating locking pin 107 extending from the exterior wall of crankcase 80. A bias spring 108 is provided between knob 105 and the head 109 of screw 70, thereby to urge knob 105 to a locked position wherein pin 107 extends through a hole 106, as can be seen in Fig. 3. To turn screw 70, therefore, knurled knob 105 must first be pulled against the force of spring 108 to release a hole 106 from engagement with pin 107; then knob 105 may be freely turned, and screw 70 will turn therewith. In this manner, each screw 70 can be independently adjusted in relation to bushing 102 to determine the contact dwell of the associated electric switch; and this adjustment can be conveniently made while the rectifier is in operation.

In certain instances it is desirable to adjust the contact dwell of all six electric switches jointly. Towards this end, the portion of bushing 102 located on the outside of crankcase 80 comprises a pinion gear having circumferentially disposed teeth. A cooperating racking member comprises a yoke having geared arms 110 and 111, each extending along one side of the crankcase 80, and a common operating shaft 112. Each arm 110 and 111 is positioned along the top of the three pinion gears associated with the three toggle mechanisms located on that side of crankcase 80, as is clearly shown in Fig. 2. Suitable guide brackets 113 and 114 are provided to hold geared arms 110 and 111 respectively in meshed or coupled relationship with the pinion gears. Longitudinal movement of the racking member will cause all bushings 102 to rotate in unison within their circular openings in the walls of crankcase 80. However, no screw 70 can turn because all knobs 105 are in their locked positions. In other words, while the bushing or nut 102 is turned by the racking member, screw 70 is prevented from turning, and as a result there is relative movement of bearing disk 103 with respect to the wall of the crankcase. The three screws 70 located on one side of crankcase 80 have clockwise threads, while the three screws 70 located on the opposite side have counterclockwise threads. Thus, longitudinal movement of the single operating shaft 112 of the racking member will jointly vary the contact dwell of all six electric switches. Movement of shaft 112 may be accomplished by suitable operating means, not shown. Such means may be manual or automatic. Automatic operating means, such as an electric motor, could be made responsive to the magnitude of rectified current, and in this manner the mechanical rectifier equipment could be made to adjust automatically the contact dwell of the electric switches to accommodate for changes in load requirements.

While I have shown and described a preferred form of my invention by way of illustration, many modifications will occur to those skilled in the art. I, therefore, contemplate by the appended claims to cover all such modifications as fall within the true spirit and scope of my invention.

What I claim as new and desire to secure by Letters Patent of the United States is:

1. In a high speed reciprocating switching device: a toggle mechanism including first and second links each having one end pivotally interconnected to form a knee; a movable switch member pivotally connected to the other end of said first link for reciprocating movement along a path disposed generally endwise to said toggle mechanism; support means pivotally connected to the other end of said second link, said support means comprising an elongated member disposed generally perpendicular to said second link, a first end of said support member being pivotally connected to the other end of said second link and a second end of said support member being pivotally connected to a fixed point; adjusting means for pivotally moving said support means about its second end thereby to adjust the position of said first end in a generally endwise direction with respect to said toggle mechanism; and a rotatable member rotating at a predetermined rate of at least one revolution per second, said rotatable member including an eccentric rigidly connected to said knee to drive said knee through a cyclic generally lateral path of movement thereby producing highly repetitive reciprocating movement of said switch member, the instantaneous position of said switch member relative to the lateral displacement of said knee being determined by the setting of said adjusting means.

2. In a reciprocating switching device: a rotatable member having an axis and an eccentric; a toggle mechanism including first and second links each having one end pivotally joined together to form a knee; a movable switch member pivotally connected to the other end of said first link and disposed for reciprocating movement in a generally transverse direction with respect to the axis of said rotatable member; support means comprising an L-shaped member having one leg pivotally connected to the other end of said second link, the vertex of said L-shaped member being pivotally supported at a point spaced laterally from said second link so that said one leg is disposed generally perpendicular to said second link; bias means tending to tilt said support means about its vertex in a direction to urge said one leg toward said second link; adjustably positioned stop means disposed in cooperating relationship with said support means to determine the extent to which said support means may be tilted in accordance with its bias; and means rigidly interconnecting said eccentric and said knee, whereby said reciprocating motion is imparted to said switch member by rotation of said rotatable member.

3. In a reciprocating switching device for performing a plurality of highly repetitive switching functions; a rotatable camming member having an axis and operating at a constant rate of more than one revolution per second; a pair of movable switch members disposed in spaced relationship on opposite sides of said axis for reciprocating movement along straight-line paths generally transverse to said axis; a pair of relatively stationary switch members disposed in cooperating relationship with said movable switch members, respectively; a pair of elongated support members associated with said movable switch members, respectively, each one of said support members having a first end normally disposed on the line of movement of the associated movable switch member in spaced apart relationship therefrom and having a second end pivotally mounted at a fixed point disposed laterally with respect to said line of movement, whereby each one of said elongated support members is normally disposed generally perpendicular to the line of movement of the associated movable switch member; a pair of toggle mechanisms each connected between the first end of one of said support members and the associated movable switch member; means rigidly connecting each one of said toggle mechanisms to said camming member thereby to drive the toggle mechanism through highly repetitive cycles of opening and closing movement, whereby said movable switch members are moved in opposing relationship with respect to each other reciprocally to engage and disengage the respective stationary switch members during successive portions of each operating cycle of said camming member; and separate adjusting means for pivotally moving each one of said support members about its second end to adjust the position of its first end along a path generally collinear to the line of movement of the associated movable switch member thereby to determine the precise portions of each operating cycle during which said movable switch member and its associated stationary switch member are engaged and disengaged, respectively.

4. A reciprocating switching device comprising: a crank shaft having a plurality of crankpins; a plurality of movable switch contacts each disposed for cyclic reciprocating movement in a direction generally transverse to the axis of said crankshaft; a plurality of cooperating relatively stationary switch contacts each disposed for circuit making engagement by a different one of said movable switch contacts during a portion of its reciprocating cycle; a plurality of elongated support members each having first and second ends; a plurality of toggle mechanisms each connected between one of said movable switch contacts and the first end of one of said support members; separate means pivotally mounting the second end of each support member at a fixed point spaced laterally with respect to the associated toggle mechanism, whereby the first end of each support member can move arcuately with respect to the second end; a plurality of rigid links respectively connected between said toggle mechanisms and said crankpins, whereby rotation by said crankshaft is translated into cyclic reciprocating movement of said movable switch contacts; separate bias means associated with each one of said support members to deflect the support member about its second end; a plurality of mounting members each movably disposed with respect to a fixed point located adjacent one of said support members; a separate adjustable stop means mounted on each one of said mounting members and independently movable in relation thereto, said stop means being disposed in cooperating relationship with the adjacent support member to define the limit of its deflection and thereby to limit in one direction the arcuate movement of the first end of said support member and accordingly to determine the circuit making portion of a reciprocating cycle of the associated movable switch contact; and a single means coupled to all of said mounting members to move said mounting members in unison thereby jointly varying the circuit making portions of the reciprocating cycles of all of said movable switch contacts.

References Cited in the file of this patent

UNITED STATES PATENTS

| 837,854 | Larson | Dec. 4, 1906 |
| 1,578,354 | O'Keeffe | Mar. 30, 1926 |
| 1,611,593 | Kapitza | Dec. 21, 1926 |
| 2,227,937 | Koppelmann | Jan. 7, 1941 |
| 2,737,549 | Thomson | Mar. 6, 1956 |

FOREIGN PATENTS

| 569,637 | Germany | Feb. 6, 1933 |
| 699,141 | Germany | Nov. 23, 1940 |